United States Patent [19]

Aeschlimann et al.

[11] Patent Number: 4,841,028

[45] Date of Patent: Jun. 20, 1989

[54] REACTIVE DYES COMPRISING A REACTIVE RADICAL BONDED TO THE CHROMOPHOR BY A UREA BRIDGE MEMBER

[76] Inventors: Peter Aeschlimann, Sandweg 16, 4123 Allschwil; Hansrudolf Schwander, Unterm Schellenberg 189, 4125 Riehen, both of Switzerland

[21] Appl. No.: 86,173

[22] Filed: Aug. 10, 1987

Related U.S. Application Data

[63] Continuation of Ser. No. 913,557, Sep. 29, 1986, abandoned, which is a continuation of Ser. No. 771,128, Aug. 30, 1985, abandoned.

[30] Foreign Application Priority Data

Aug. 30, 1984 [CH] Switzerland ......................... 4155/84

[51] Int. Cl.⁴ ................... C09B 62/527; C09B 52/525; C09B 62/535; C09B 62/537
[52] U.S. Cl. .................... 534/629; 260/370; 260/371; 260/372; 260/374; 260/507 R; 260/544 C; 534/588; 534/591; 534/593; 534/618; 534/637; 534/638; 534/641; 540/130; 540/134; 540/140; 544/76; 560/360
[58] Field of Search ............................. 534/641–629, 534/618, 637, 638; 540/130, 134, 140; 544/76; 260/370, 371, 372, 374

[56] References Cited

U.S. PATENT DOCUMENTS

| | | | |
|---|---|---|---|
| 3,419,542 | 12/1968 | Meininger et al. | 534/641 X |
| 3,998,805 | 12/1976 | Koller et al. | 534/641 |
| 4,065,446 | 12/1977 | Bien et al. | 534/641 X |

FOREIGN PATENT DOCUMENTS

| | | | |
|---|---|---|---|
| 43-17292 | 12/1968 | Japan | 534/641 |
| 43-30190 | 12/1968 | Japan | 534/641 |
| 47-25445 | 7/1972 | Japan | 534/641 |
| 868742 | 5/1961 | United Kingdom | 534/641 |
| 876496 | 9/1961 | United Kingdom | 534/641 |
| 1013442 | 12/1965 | United Kingdom | 534/641 |
| 1155149 | 6/1969 | United Kingdom | 534/641 |
| 1377190 | 12/1974 | United Kingdom | 534/641 |

*Primary Examiner*—Floyd D. Higel
*Attorney, Agent, or Firm*—Wenderoth, Lind & Ponack

[57] ABSTRACT

Reactive dyes of the formula

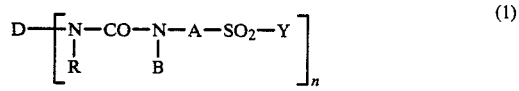

in which D is the radical of an organic dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, R is hydrogen or substituted or unsubstituted $C_{1-4}$-alkyl, A is a polymethylene radical having 2 to 6 C atoms (or its branched isomers) which can be substituted by chlorine, bromine, fluorine, hydroxyl, sulfato, acyloxy having 1 to 4 C atoms, cyano, carboxyl, alkoxycarbonyl having 1 to 5 C atoms or carbamoyl, or an alkyleneoxalkylene radical having 1 to 6 C atoms in each alkylene member, independently of each other; Y is a radical —CH=CH₂ or —CH₂CH₂—Z, Z is an inorganic or organic radical detachable under alkaline conditions, B is hydrogen or the radical of a substituted or unsubstituted hydrocarbon, and n is 1 or 2, are suitable for dyeing or printing cellulose-containing and nitrogen-containing materials and in a high dyeing yield produce dyeings and prints of good fastness properties.

18 Claims, No Drawings

REACTIVE DYES COMPRISING A REACTIVE RADICAL BONDED TO THE CHROMOPHOR BY A UREA BRIDGE MEMBER

This application is a continuation of now abandoned application Ser. No. 913,557, filed Sept. 29, 1986, which application is a continuation of now abandoned application Ser. No. 771,128, filed Aug. 30, 1985.

The present invention relates to novel reactive dyes, to a process for their preparation and to their use for dyeing and printing fibre materials.

The practice of dyeing with reactive dyes has recently led to increased demands on the quality of the dyeings and the economics of the dyeing process. There consequently continues to be a demand for new reactive dyes which have improved properties, in particular application properties.

The present demand in the dyeing of cotton by the cold pad-batch method is for reactive dyes which have adequate substantivity at the low dyeing temperature and which also have good wash-off properties with respect to the unfixed portions. They should also have a high reactivity, so that only short batching times are necessary, and they should in particular produce dyeings having high degrees of fixation. These demands are met only inadequately by known dyes.

The present invention therefore has for its object to find new, improved reactive dyes for the cold pad-batch method which have the qualities characterised above to a high degree. The new dyes should be distinguished in particular by high degrees of fixation and high fibre-dye bond stabilities and moreover the portions not fixed on the fibre should be readily washed off. They should furthermore produce dyeings having good all-round fastness properties, for example light and wet fastness properties.

This object is achieved with the novel fibre-reactive dyes defined hereinafter.

The invention accordingly provides reactive dyes of the formula

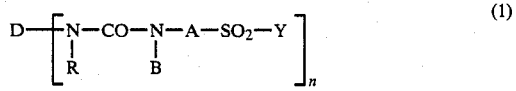

in which D is the radical of an organic dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, R is hydrogen or substituted or unsubstituted $C_{1-4}$-alkyl, A is a polymethylene radical having 2 to 6 C atoms (or its branched isomers) which can be substituted by chlorine, bromine, fluorine, hydroxyl, sulfato, acyloxy having 1 to 4 C atoms, cyano, carboxyl, alkoxycarbonyl having 1 to 5 C atoms or carbamoyl, or an alkyleneoxyalkylene radical having 1 to 6 C atoms in each alkylene member, independently of each other; Y is a radical —CH=CH$_2$ or —CH$_2$CH$_2$—Z, Z is an inorganic or organic radical detachable under alkaline conditions, B is hydrogen or the radical of a substituted or unsubstituted hydrocarbon, and n is 1 or 2.

The radical D in the formula (1) can contain, bonded to its basic structure, the substituents customary with organic dyes.

Examples of further substituents in the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl and sulfo. Preferably the radical D contains one or more sulfo groups. Reactive dyes of the formula (1) in which D is the radical of an azo dye contain as substituents in particular methyl, ethyl, methoxy, ethoxy, acetylamino, benzoylamino, amino, chlorine, bromine, ureido, hydroxyl, carboxyl, sulfomethyl or sulfo.

An alkyl radical R can be straight-chain or branched; it can be further substituted, for example by halogen, hydroxyl, cyano, $C_{1-4}$-alkoxy, carboxyl or sulfo. Examples of R are the following radicals: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably R is hydrogen, methyl or ethyl.

A polymethylene radical A in the formula (1) can be a straight-chain or branched alkylene radical, for example ethylene, n-propylene, isopropylene, n-butylene, n-pentylene or n-hexylene. This radical can likewise be further substituted, for example by chlorine, cyano or hydroxyl. Preference is given to $C_{2-4}$-alkylene which contains no further substituents in particular ethylene.

An inorganic or organic radical Z detachable under alkaline conditions can be one of the following anionically detachable groups:

—OSO$_3$H, —SSO$_3$H, —OCOCH$_3$, —OPO$_3$H$_2$,

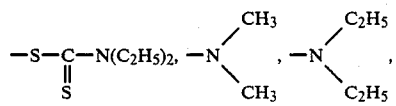

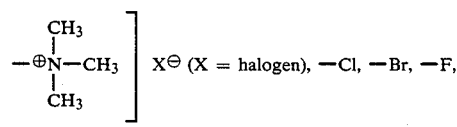

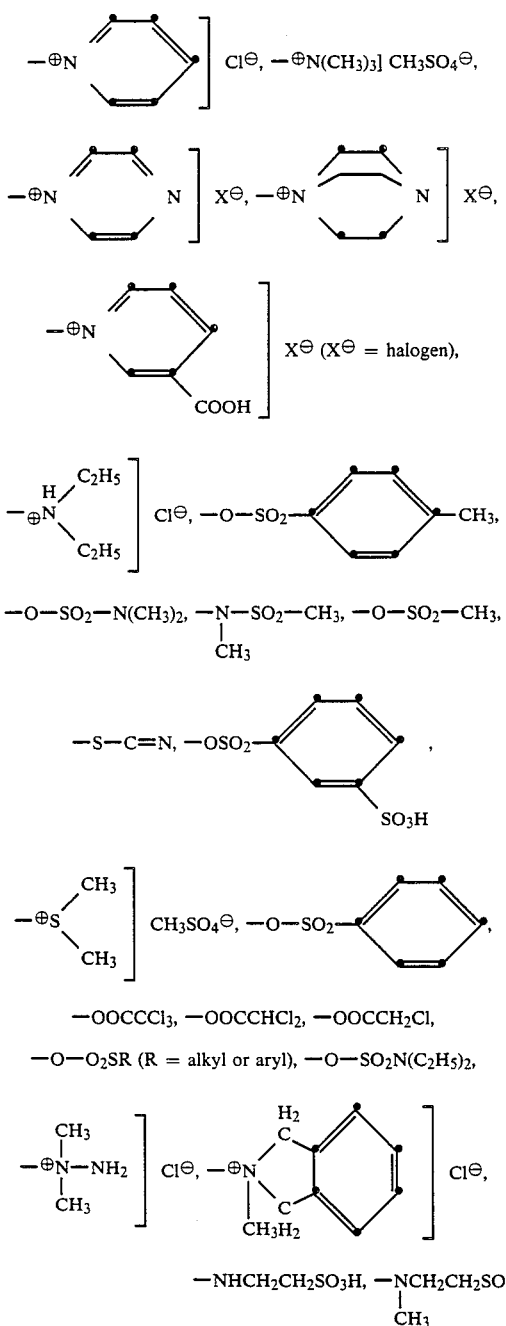

Preferably Z is the radical —OSO$_3$H, —SSO$_3$H, —O-COCH$_3$, —OPO$_3$H$_2$ or —Cl.

The radical of a substituted or unsubstituted hydrocarbon B is for example an alkyl radical which is straightchain or branched, which preferably has 1 to 6 carbon atoms and which can be further substituted, for example by halogen, hydroxyl, cyano, alkoxy, carboxyl or sulfo, or an unsubstituted alkyl radical having 7 to 20 carbon atoms, a cyclohexyl radical, or a phenyl radical which can be substituted, for example, by methyl, ethyl, methoxy, ethoxy, chlorine, bromine, carboxyl, sulfo or sulfomethyl.

Examples of B are the following substituents: methyl, ethyl, propyl, isopropyl, butyl, isobutyl, sec.-butyl, tert.-butyl, pentyl, hexyl, nonyl, dodecyl, hexadecyl, pentadecyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-chloropropyl, γ-bromopropyl, sulfomethyl, β-sulfoethyl, aminosulfonylmethyl, β-sulfatoethyl, cyclohexyl, phenyl, o- , m- or p-chlorophenyl, -o , m- or p-methylphenyl, p-ethylphenyl, p-methoxyphenyl, o- , m- or p-sulfophenyl, p-carboxyphenyl and p-sulfomethylphenyl. Preference is given to unsubstituted alkyl radicals having 1 to 4 carbon atoms.

In particular B is hydrogen or a radical of the formula $$-A-SO_2-Y \qquad (2)$$

in which A and Y are as defined under the formula (1).

If B is a radical of the formula (2), the two radicals of the formula (2) which are bonded to the nitrogen atom of the external radical in the formula (1) can be identical or different. Preferably the two radicals of the formula (2) are identical.

The formula (1) part which is enclosed in square brackets is a reactive radical which can be present in the molecule once or twice; the two variants of the formula are equal in importance. If n is 2, the two reactive radicals can be identical or different; preferably the two radicals are identical. The reactive radical contains one or two substituents Y which can react in the manner of a nucleophilic addition.

Fibre-reactive compounds are to be understood as meaning those which are capable of reacting with the hydroxyl groups of cellulose, the amino, carboxyl, hydroxyl and thiol groups of wool and silk or with the amino and possibly carboxyl groups of nylons to form covalent chemical bonds.

Preferred embodiments of the reactive dyes of the formula (1) are:

(a) reactive dyes of the formula (1) in which B is hydrogen or C$_{1-4}$-alkyl.

(b) reactive dyes of the formula (1) in which B is a radical of the formula $$-A-SO_2-Y \qquad (2)$$

in which A and Y are as defined under the formula (1).

(c) reactive dyes of the formula (1) in which A is ethylene.

The symbols in the formula (1) which have not been mentioned in (a) to (c) are as defined in the explanation of the formula (1). Also to be included are in particular combinations of features as per (a) to (c). Preference is further given to:

(d) reactive dyes as per (a) of the formula

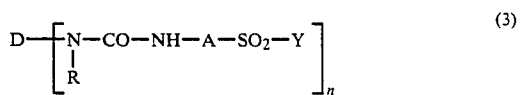

in which D, R, Y and n are as defined under the formula (1) and A is C$_{2-4}$-alkylene.

(e) reactive dyes as per (d) in which A is ethylene.

(f) reactive dyes as per (b) of the formula

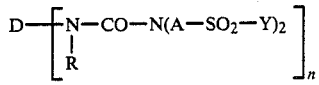 (4)

in which D, R, Y and n are as defined in the formula (1) and A is $C_{2-4}$-alkylene.

(g) reactive dyes as per (f) in which A is ethylene.

(h) reactive dyes of the formula (1) or as per (a) to (g) in which Y is vinyl, β-sulfatoethyl, β-thiosulfatoethyl, β-phosphatoethyl, β-chloroethyl or β-acetoxyethyl.

(i) reactive dyes of the formula (1) or as per (a) to (h) in which D is the radical of a monoazo or disazo dye.

(j) reactive dyes of the formula (1) or as per (a) to (h) in which D is the radical of a metal complex azo or formazan dye.

(k) reactive dyes of the formula (1) or as per (a) to (h) in which D is the radical of an anthraquinone dye.

(l) reactive dyes as per (j) in which D is the radical of a 1:1 copper complex azo dye of the benzene or naphthalene series and the copper atom is bonded to a metallisable group on either side, in ortho-position relative to the azo bridge.

Preference is given in particular to:

(m) reactive dyes as per (1) of the formula

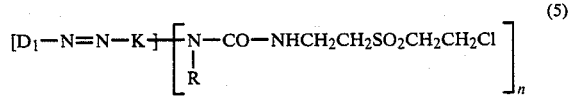 (5)

in which $D_1$ is the radical of a diazo component of the benzene or naphthalene series, K is the radical of a coupling component of the benzene or naphthalene series or of the heterocyclic series, R is hydrogen, methyl or ethyl, and n is 1 or 2, and the reactive radical is bonded to the diazo component or to the coupling component, or one reactive radical each is bonded to the diazo component and to the coupling component.

(n) reactive dyes as per (i) of the formula

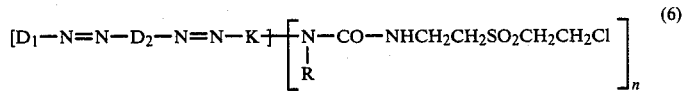 (6)

in which $D_1$ and $D_2$ are each a radical of a diazo component of the benzene or naphthalene series, K is the radical of a coupling component of the benzene or naphthalene series or of the heterocyclic series, R is hydrogen, methyl or ethyl, and n is 1 or 2, and the reactive radical is bonded to the diazo component $D_1$ or to the coupling component K or one reactive radical each is bonded to $D_1$ and K.

(o) reactive dyes as per (i) of the formula

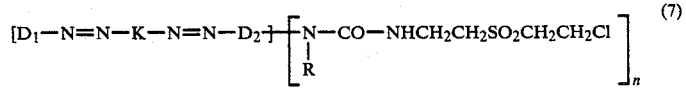 (7)

in which $D_1$ and $D_2$ are each a radical of a diazo component of the benzene or naphthalene series, K is the radical of a coupling component of the aminonaphtholsulfonic acid series, R is hydrogen, methyl or ethyl, and n is 1 or 2, and the reactive radical is bonded to the diazo component $D_1$ or to the diazo component $D_2$, or one reactive radical each is bonded to $D_1$ and $D_2$.

(p) 1:1 copper complexes of reactive dyes as per (m) to (o).

The process for preparing reactive dyes of the formula (1) comprises reacting organic dyes of the formula

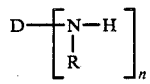 (8)

or dye precursors, and at least one equivalent of an agent introducing the radical of the formula

 (9)

to form a reactive dye of the formula (1), D, R, n, A, Y and B in the formulae (8) and (9) being as defined under the formula (1), and in the case of the use of dye precursors converting these into the desired final dyes.

If desired, the process according to the invention is followed by a further conversion reaction. The couplings involved in the preparation of the final dyes from precursors are in the main couplings which lead to azo dyes.

A radical of the formula (9) can be introduced by various methods. Preferably dyes of the formula (8) or suitable precursors which contain a —N(R)H group are reacted with isocyanates of the formula

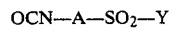 (10)

or with carbamoyl chlorides of the formula

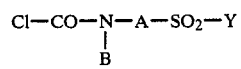 (11)

to form the substituted urea of the formula (1). Or first the dye or the precursor is condensed with phenyl chlorocarbonate to give the corresponding phenyl carbamate. The latter is reacted with an amine of the formula

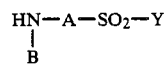 (12)

to form the dye of the formula (1) or a secondary precursor, phenol being set free.

The isocyanates of the formula (10) and the carbamoyl chlorides of the formula (11) can be obtained by phosgenation of amines of the formula (12), in the case of the isocyanate B being H in the formula (12). For further details concerning the possible methods, see HOUBEN-WEYL, Methoden der Organischen Chemie [Methods of organic chemistry], 4th edition 1952, Georg Thieme Verlag, Stuttgart, Volume VIII, oxygen compounds III, pages 149 to 163.

The synthesis can further be followed by elimination reactions. For example, it is possible to treat reactive dyes of the formula (1) which contain sulfatoethylsulfonyl radicals with agents, such as sodium hydroxide, which eliminate hydrogen halide, and the sulfatoethylsulfonyl radicals convert into vinylsulfonyl radicals.

In a modified embodiment of the process, the first step is to prepare a dye which contains a precursor of the reactive radical and subsequently to convert this precursor into the final stage, for example by esterification or an addition reaction. For instance, it is possible to prepare a dye in which Y is an HO—CH$_2$CH$_2$— radical, and to react the intermediate with sulfuric acid before or after the acylation, so that the hydroxyl group is converted into a sulfato group; or to use an analogous dye in which Y is a vinyl group, namely H$_2$C=CH—, and to add thiosulfuric acid onto the intermediate to form an HO$_3$SS—CH$_2$CH$_2$— radical. The sulfation of the hydroxyl group in a dye of the formula (1) or a suitable precursor is effected for example by reaction with concentrated sulfuric acid at 0° C. to moderately elevated temperature. The sulfation can also be effected by reacting the hydroxy compound with two equivalents of chlorosulfonic acid per hydroxyl group in a polar organic solvent, for example N-methylpyrrolidone, at 10° to 80° C. Preferably the sulfation is effected by adding the compound in question to sulfuric acid monohydrate at temperatures between 5° and 15° C. The introduction of another radical detachable under alkaline conditions, for Z, in a compound of the formula (1) or an intermediate in place of the sulfato group, for example a thiosulfato group, is effected in a manner known per se. The preparative pathway via an intermediate of the reactive radical proceeds in many cases to a single compound and completion.

The process variant where the starting materials are dye precursors is suitable for preparing reactive dyes of the formula (1) in which D is the radical of a dye composed of two or more than two components. Examples of such dyes composed of two or more than two components are: monoazo, disazo, trisazo, metal complex azo, formazan and azomethine dyes. In principle, the reactive dyes of the formula (1) of all dye classes can be prepared in a manner known per se or analogously to known procedures by starting from precursors or intermediates for dyes which contain fibre-reactive radicals as per the formula (1) or by introducing these fibre-reactive radicals into intermediates suitable for this purpose and having dye character.

Preference is given to reactive dyes of the formula (1) in which D is the radical of a monoazo or disazo dye or of a metal complex azo dye. In this case the reactive radicals are bonded to the diazo or coupling component or, if n is 2, to different or identical radicals of starting components, i.e. diazo or coupling components. Preferably, in the case where n is 2, the two reactive radicals are bonded to one component each, namely to a diazo component or a coupling component. The reactive dyes then have the formulae for example

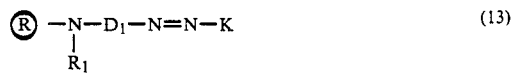 (13)

 (14)

and

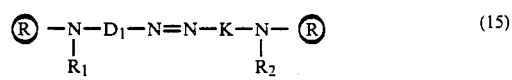 (15)

in which $R_1$ and $R_2$, independently of each other, are defined in the same way as R in the formula (1), $D_1$ is the radical of a diazo component, K is the radical of a coupling component, and Ⓡ is a reactive radical. Also possible are reactive dyes of the formulae (13) to (15) in which the radical $D_1$ and/or K includes a further reactive radical, so that tri- and tetra-reactive dyes are also included. The additional reactive radicals included in $D_1$ or K, such as Ⓡ, can be bonded to $D_1$ or K via an amino group or in some other way, for example through a direct bond. The above explanations apply mutatis mutandis also to disazo dyes and metal complex azo dyes.

Also possible are reactive dyes of the formula (1) in which one of the reactive radicals or both are bonded to the chromophore by a radical of the formula

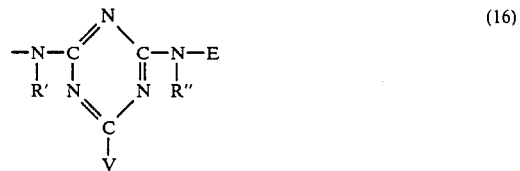 (16)

Therein the radical of the formula (9) is bonded to E via the —N(R)— group; E is a substituted or unsubstituted aliphatic or aromatic bridge member. The bridge member E is preferably an alkylene or arylene radical. For instance, E can be a long (for example having 10 or more carbon atoms) or shorter, straight-chain or branched alkylene radical; it can be in particular an alkylene radical having 2 to 6 carbon atoms, for example ethylene, propylene, butylene, hexylene or cyclohexylene. An arylene radical E is for example a naphthylene radical, the radical of a biphenyl or stilbene or in particular a phenylene radical. The radical E can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl or sulfo. R' and R", independently of each other, are hydrogen or a substituted or unsubstituted $C_{1-4}$-alkyl radical; and V is a halogen atom, a substituted or unsubstituted amino group, hydroxyl or an alkoxy, aryloxy, alkylthio or arylthio group.

If the starting materials used are dye precursors, the reactive dyes of the formula (1) are obtained by reacting a component of the dye of the formula (8) which contains a —N(R)H group with an agent introducing the radical of the formula (9) and then with the other component of the dye of the formula (8). In preparing the preferred azo dyes, the diazo components and the coupling components together need to contain at least one —N(R)H amino group and can contain further amino groups. In this case the diazo components used are in particular 1,3-phenylenediamine-4-sulfonic acid, 1,4-phenylenediamine-2-sul-fonic acid, 1,4-phenylenediamine-2,5-disulfonic acid or 1,3-phenylenediamine-4,6-disulfonic acid. If desired, use is made of corresponding acetylamino or nitro compounds in which the acetylamino or nitro group is converted into the $H_2N$ group by hydrolysis or reduction respectively before the reaction with an agent introducing the radical of the formula (9).

If groups capable of metal complex formation are present in the reactive dyes prepared, such as hydroxyl, carboxyl, amino or sulfo, the reactive dyes can also be subsequently metallised. For instance, metal complex azo dyes are obtained by treating azo compounds obtained according to the invention which contain complexing groups, for example hydroxyl or carboxyl groups, in ortho-ortho' position relative to the azo bridge with agents giving off heavy metal before or if desired after the introduction of the radical of the formula (9). Copper complexes of reactive dyes of the formula (1) are of particular interest. Suitable metallisation methods, in addition to that mentioned above, also include dealkylating metallisation and, for the preparation of copper complexes, oxidative coppering.

The most important process variants are described in the illustrative embodiments.

There now follows a detailed list of possible starting materials which can be used for preparing the reactive dyes of the formula (1).

Organic dyes of the formula (8)

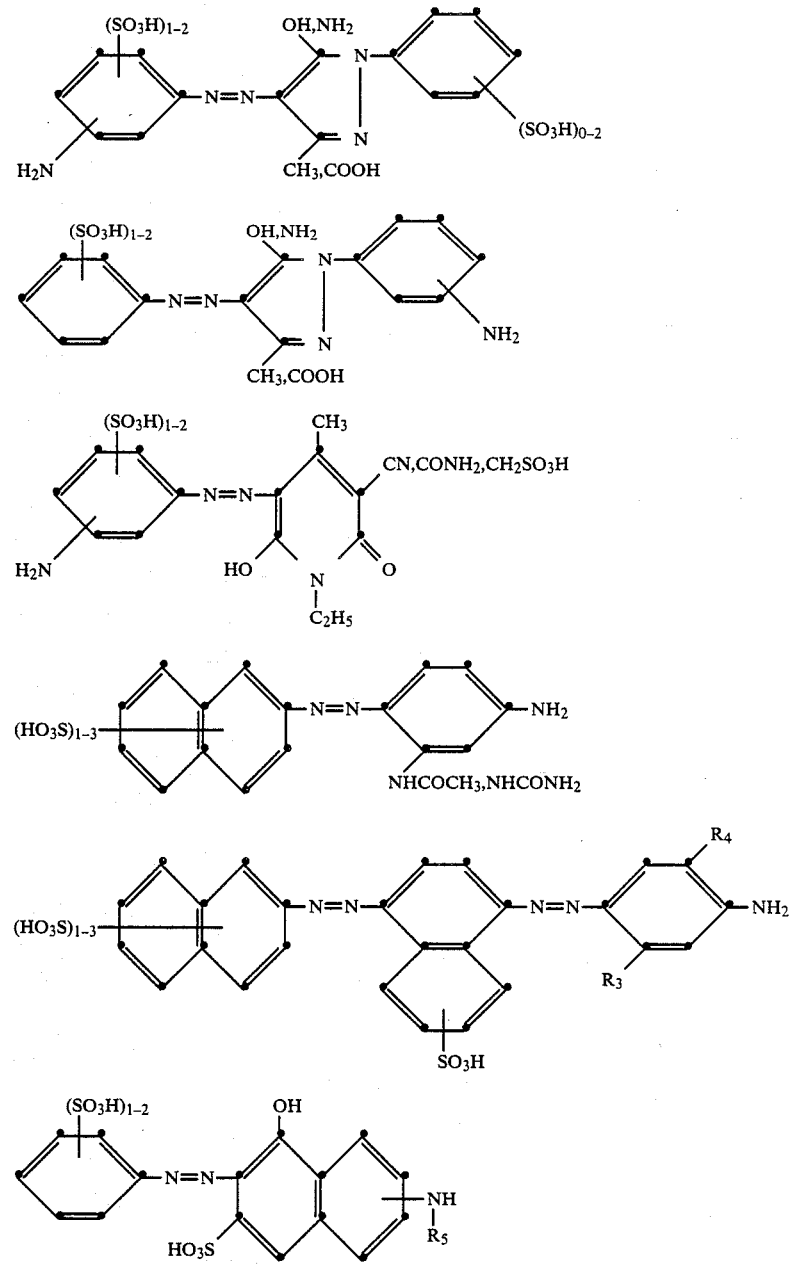

-continued
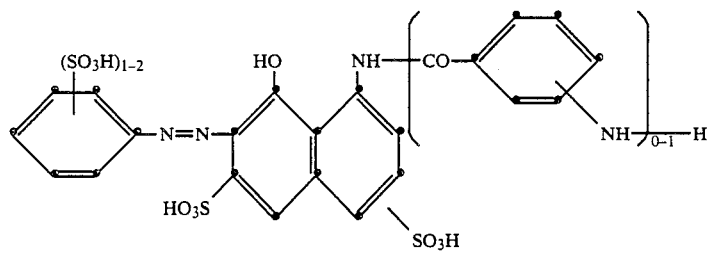
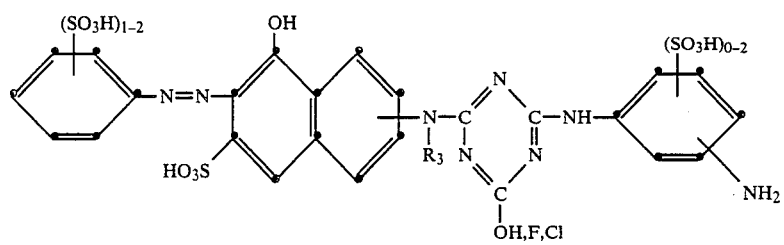
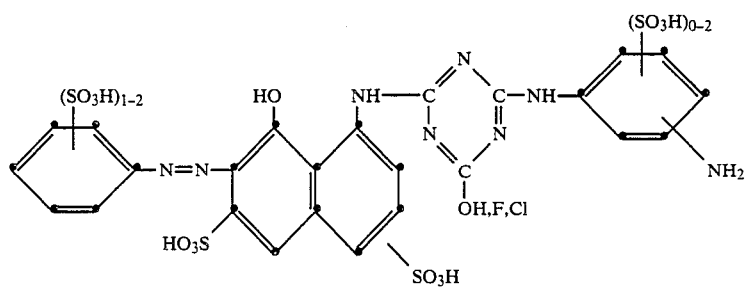
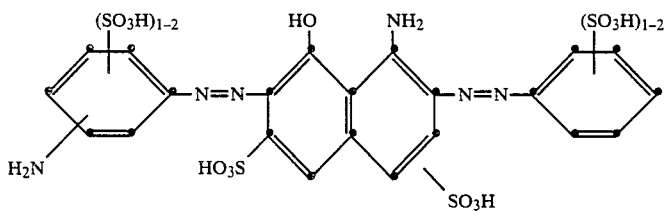
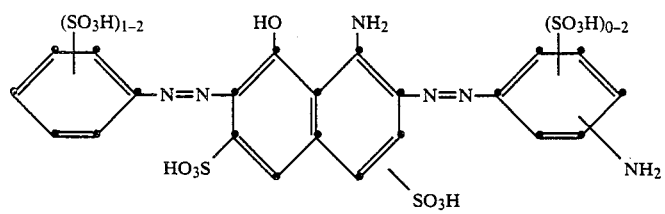
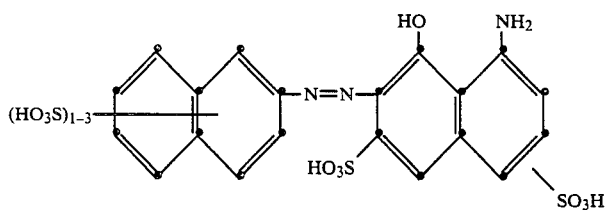
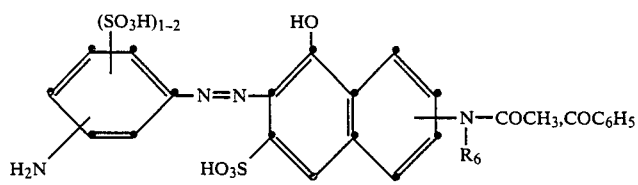

-continued
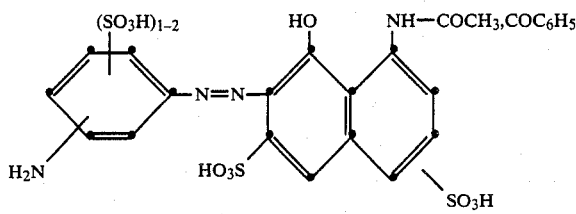
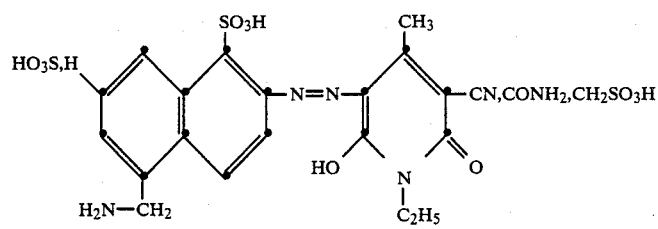
Metal complexes of dyes of the formulae:
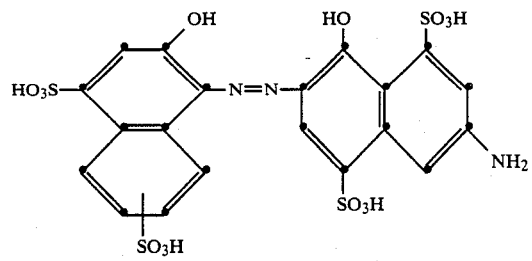
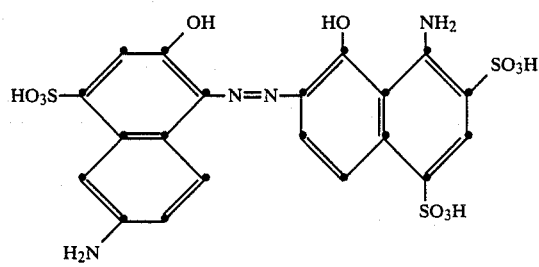
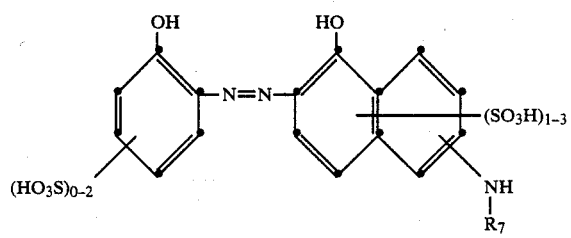
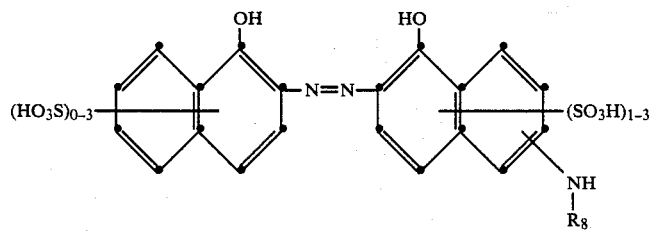

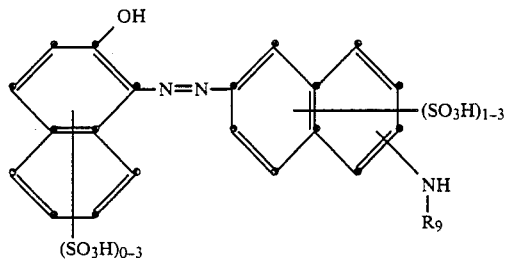

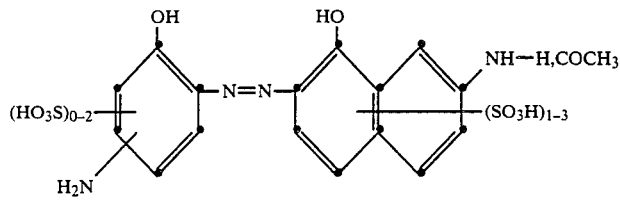

Preferred metal atoms are Cu (1:1 complex) or Cr and Co (1:2 complex). Cr- and Co-complexes can contain the azo compound of the abovementioned formula once or twice, i.e. they can be of symmetrical structure or, by incorporating any other ligands, of asymmetrical structure.

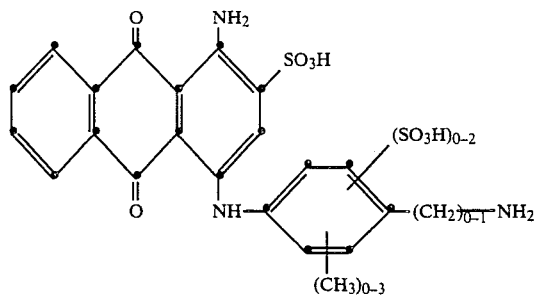

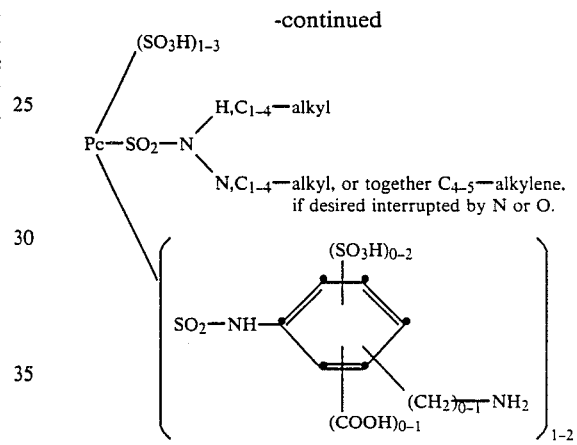

In this formula, Pc is the Cu- or Ni-phthalocyanine radical, and the total number of substituents of the Pc skeleton is 4.

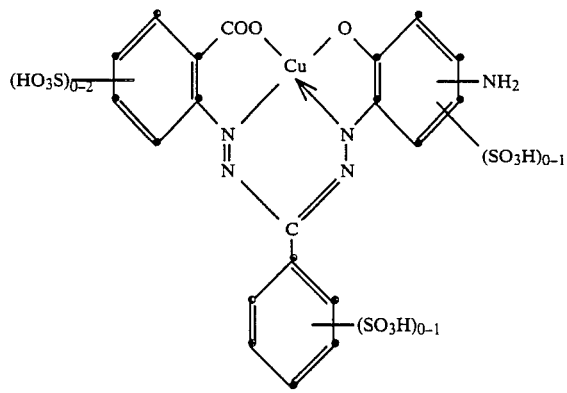

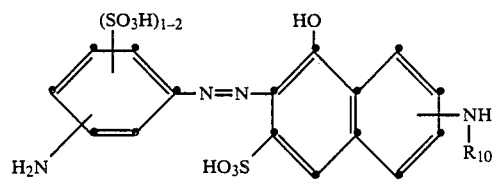

-continued
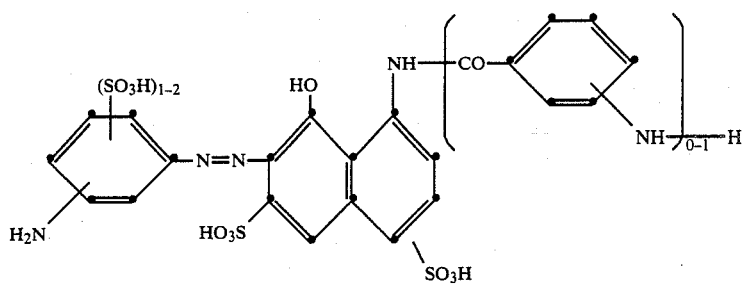
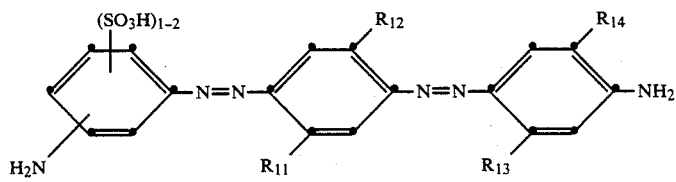
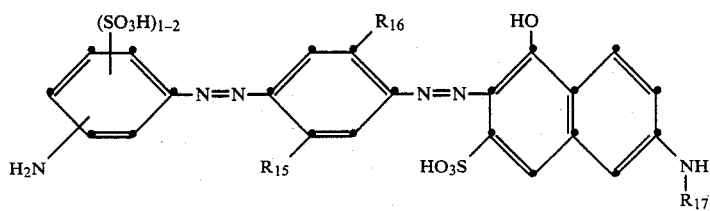
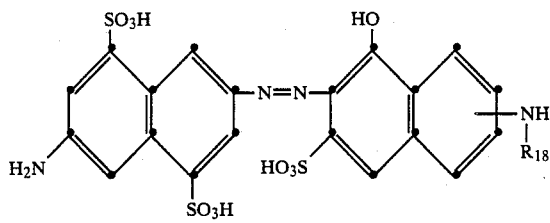
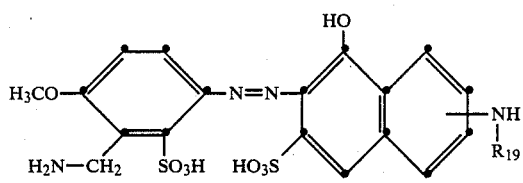
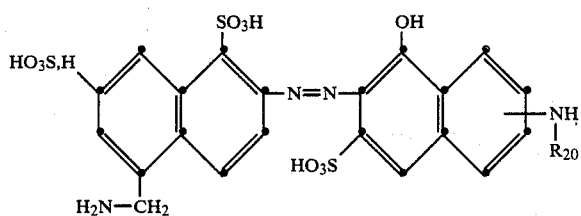
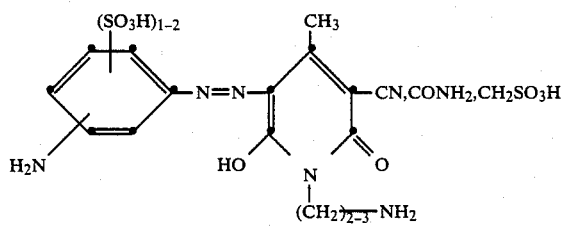

-continued
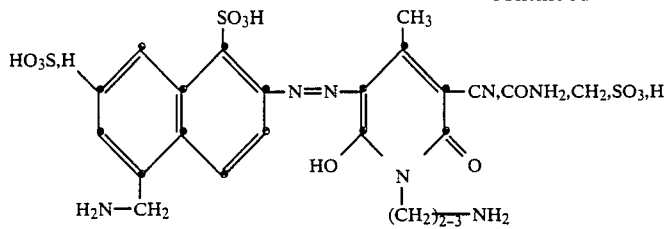
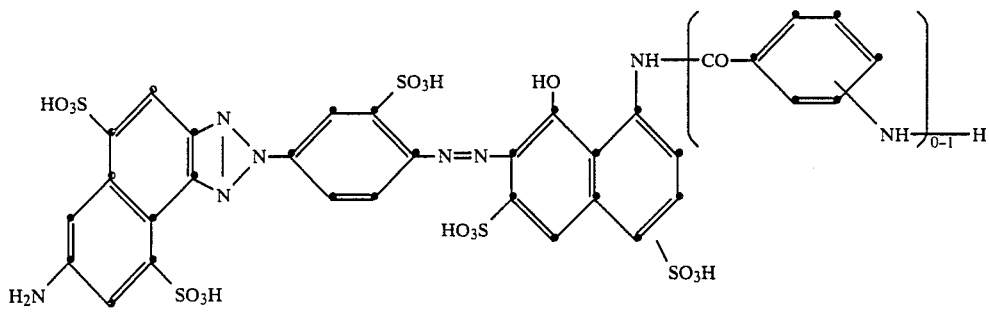
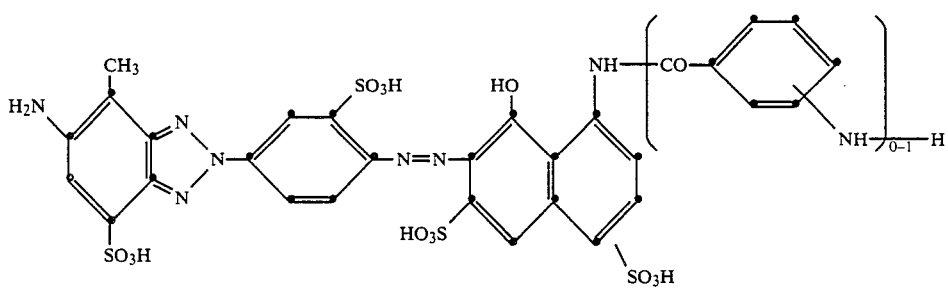
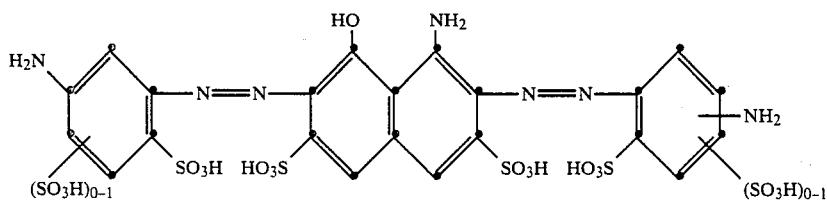
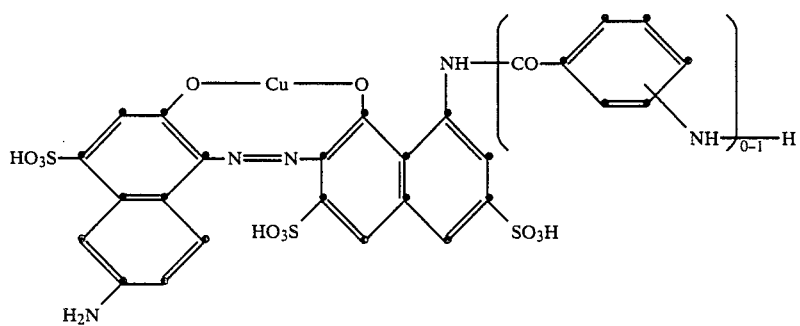
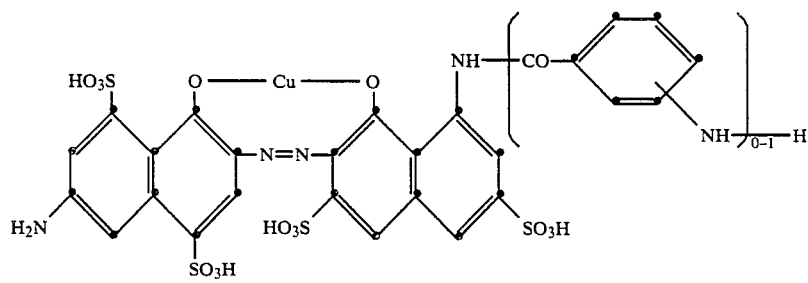

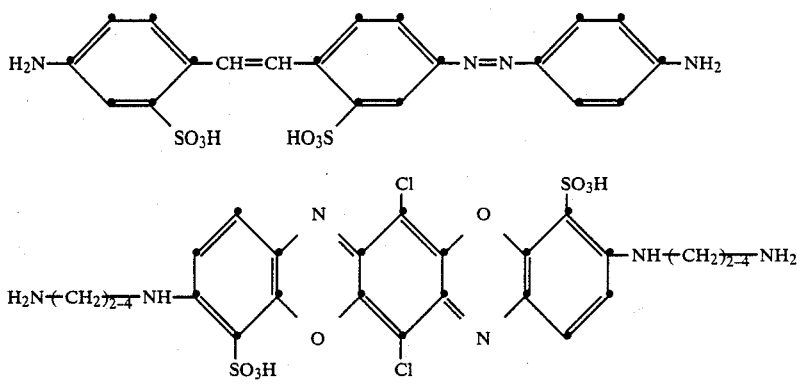

In the formulae listed above, the radicals $R_5$ to $R_{10}$ and $R_{17}$ to $R_{20}$ are hydrogen or $C_{1-4}$-alkyl, and the radicals $R_3$, $R_4$ and $R_{11}$ to $R_{16}$ are hydrogen, $C_{1-4}$-alkyl, $C_{1-4}$-alkoxy, $C_{1-4}$-alkylamino, ureido or halogen, the radicals $R_3$, $R_4$ . . . etc. which belong to one and the same formula being independent of one another. Preferably the radicals $R_5$ to $R_{10}$ and $R_{17}$ to $R_{20}$ are hydrogen, methyl or ethyl and the radicals $R_3$, $R_4$ and $R_{11}$ to $R_{16}$ are hydrogen, methyl, ethyl or methoxy, ethoxy, acetylamino, ureido or chlorine. The aromatic rings in the above dyes can be further substituted, the benzene rings in particular by methyl, methoxy, ethoxy, carboxyl, acetylamino or chlorine and the naphthalene rings in particular by methoxy, carboxyl, acetylamino, nitro or chlorine; the same applies to the anthraquinones, dioxazines and so on. Preferably the benzene rings are not further substituted. The diazo components used in this case are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid.

Specific examples of diazo and coupling components are:

Diazo Components:

Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3-or -4-carboxylic acid, 2-aminodiphenyl ether, 1-aminobenzene-2-, -3- or -4-sulfonamide, -N-methylamide, -N-ethylamide, -N,N-dimethylamide or -N,N-diethylamide, dehydrothio-p-toluidinesulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4-and 2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3-or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 2-aminonaphthalene-3,6-or -5,7-disulfonic acid, 1-aminonaphthalene-3,6-or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-6-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- and 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diaminoben-zene-2-methylbenzene, 4,4'-diaminodiphenyl oxide, 4,4'-diaminodiphenyl urea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid.

If the diazo component to be used is not to be a diamine but an aminoacetylamino compound from which the acetyl group is subsequently reeliminated by hydrolysis, as is described above in the explanations of the process variants, the monoacetyl compounds of the abovementioned diazo components, for example 1-acetylamino-3-aminobenzene-4-sulfonic acid or 1-acetylamino-4-aminobenzene-3-sulfonic acid, are possible.

Coupling Components

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6-or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenyl urea, 1-amino-3-acetylaminobenzene, 1-amino-3-hydroxyacetylaminobenzene, 1,3-diaminobenzene-4-sulfonic acid, 1-aminonaphthalene-6-or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6-or -4,6-disulfonic acid, 2-benzoylamino-5-hydroxynaphthalene-7-sulfonic acid, 2-amino-5-hydroxynaphthalene-7-sulfonic acid, 2-methyl- or -2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6-or -4,6-disulfonic acid, 1-(4'-nitrobenzoylamino)-8-hydroxynaphthalene-3,6-or -4,6-disulfonic acid, 1-(3'-aminobenzoylamino)-8-hydroxynaphthalene-3,6-or -4,6-disulfonic acid, 1-(3'-nitrobenzoylamino)-8-hydroxynaphthalene-3,6-or -4,6-disulfonic acid, 2-(4'-amino-3'-sulfophenylamino)-5-hydroxynaphthalene-7-sulfonic acid, 3-methylpyrazol-5-one, 1-phenyl-3-methyl-5-pyrazolone, 1-(4'-sulfophenyl)-3-methyl-5-pyrazolone, 1-(4'-sulfophenyl)-pyrazol-5-one-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphth-2'-yl)-3-methyl-5-pyrazolone, 1-(5',7'-disulfonapth-2'-yl)-3-methyl-5-pyrazolone, 1-(2',5'-dichloro-4'-sulfophenyl)-3-methyl-5-pyrazolone, 3-aminocarbonyl-4-methyl-6-hydroxypyrid-2-one, 1-ethyl-3-cyano- or -3-chloro-4-methyl-6-hydroxypyrid-2-one, 1-ethyl-3,3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)-naphthalene-3,6-disulfonic acid, 1-amino-8-hydroxy-2-(4'-sulfophenylazonaphthalene-3,6-disulfonic acid, 1-amino-8-hydroxy-2-(2',5'-disulfophenylazo)-naphthalene-3,6-disulfonic acid, 1-β-aminoethyl-3-cyano-4-methyl-6-hydroxypyrid-2-one, 1-γ-aminopropyl-3-sulfomethyl-4-methyl-6-hydroxypyrid-2-one, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1-amino-3-sulfobenzylamino-4-chlorobenzene, 1-amino-3-N,N-disulfobenzylaminobenzene.

Amines of the Formula (12)

β-(β-Chloroethylsulfonyl)-ethylamine, β-(β-bromoethylsulfonyl)-ethylamine, β-vinylsulfonylethylamine, γ-(β-chloroethylsulfonyl)-propylamine, α-(β-chloroethylsulfonyl)-isopropylamine, δ-(β-chloroethylsulfonyl)-butylamine, β-(β-chloroethylsulfonyl)-isobutylamine, ε-(β-chloroethylsulfonyl)-pentylamine, β-[β'-(β''-chloroethylsulfonyl)ethyloxy]-ethylamine, β-(β-chloroethylsulfonyl)-hexylamine, N-methyl-N-β-(β-chloroethylsulfonyl)-ethylamine, N-ethyl-N-β-(β-chloroethylsulfonyl)-ethylamine, N-propyl-N-β-(β-chloroethylsulfonyl)-ethylamine, N-butyl-N-β-(β-chloroethylsulfonyl)-ethylamine, N-pentyl-N-β-(β-chloroethylsulfonyl)-ethylamine, N-hexyl-N-β-(β-chloroethylsulfonyl)-ethylamine, N-nonyl-N-β-(β-chloroethylsulfonyl)-ethylamine, N-dodecyl-N-β-(β-chloroethylsulfonyl)-ethylamine, N-hexadecyl-N-β-(β-chloroethylsulfonyl)-ethylamine, N-octadecyl-N-β-(β-chloroethylsulfonyl)-ethylamine, N-carboxymethyl-N-β-(β-bromosulfonyl)-ethylamine, N-sulfatomethyl-N-β-(β-chloroethylsulfonyl)-ethylamine, N-β-carboxyethyl-N-γ-(β-chloroethylsulfonyl)-propylamine, N-β-sulfatoethyl-N-γ-(β-chloroethylsulfonyl)-propylamine, N-β-sulfatoethyl-N-δ-(β-chloroethylsulfonyl)-butylamine, N-β-ethoxyethyl-N-δ-(β-chloroethylsulfonyl)-butylamine, N-γ-chloropropyl-N-β-(β-chloroethylsulfonyl)-ethylamine, N-phenyl-N-β-(β-chloroethylsulfonyl)-ethylamine, N-p-chlorophenyl-N-β-(β-chloroethylsulfonyl)-ethylamine, N-o-methylphenyl-N-β-(β-chloroethylsulfonyl)-ethylamine, N-p-methoxyphenyl-N-β-(β-chloroethylsulfonyl)-ethylamine, N-m-sulfophenyl-N-β-(β-chloroethylsulfonyl)-ethylamine, N-p-sulfophenyl-N-β-(β-chloroethylsulfonyl)-ethylamine, bis-[β-(β-chloroethylsulfonyl)-ethyl]-amine, bis-[β(β-bromoethylsulfonyl)-ethyl]-amine, bis-[γ-(β-chloroethylsulfonyl)-propyl]-amine, bis-[δ-(β-chloroethylsulfonyl)-butyl]-amine, bis-(β-vinylsulfonylethyl)-amine, N-β-cyanoethyl-N-γ-(β-chloroethylsulfonyl)-propylamine.

Preference is given to the amines of low molecular weight, such as β-(β-chloroethylsulfonyl)-ethylamine and its N-methyl derivative. Also preferred is bis-[β-(β-chloroethylsulfonyl)-ethyl]-amine. β-(β-hydroxyethylsulfonyl)-ethylamine (2-taurylethanol), γ-(β-hydroxyethylsulfonyl)-propylamine, α-(β-hydroxyethylsulfonyl)-isopropylamine, δ-(β-hydroxyethylsulfonyl)-butylamine, β-(β-hydroxyethylsulfonyl)-isobutylamine, ε-(β-hydroxyethylsulfonyl)-pentylamine, β-(β-hydroxyethylsulfonyl)-hexylamine, N-methyl-N-β-(β-hydroxyethylsulfonyl)-ethylamine, N-ethyl-N-β-(β-hydroxyethylsulfonyl)-ethylamine, N-propyl-N-β-(β-hydroxyethylsulfonyl)-ethylamine, N-butyl-N-β-(β-hydroxyethylsulfonyl)-ethylamine, N-pentyl-N-β-(β-hydroxyethylsulfonyl)-ethylamine, N-hexyl-N-β-(β-hydroxyethylsulfonyl)-ethylamine, N-nonyl-N-β-(β-hydroxyethylsulfonyl)-ethylamine, N-dodecyl-N-β-(β-hydroxyethylsulfonyl)-ethylamine, N-hexadecyl-N-β-(β-hydroxyethylsulfonyl)-ethylamine, N-octadecyl-N-β-(β-hydroxyethylsulfonyl)-ethylamine, N-carboxymethyl-N-β-(β-hydroxyethylsulfonyl)-ethylamine, N-sulfatomethyl-N-β-(β-hydroxyethylsulfonyl)-ethylamine, N-β-carboxyethyl-N-β-(β-hydroxyethylsulfonyl)-propylamine, N-β-sulfatoethyl-N-γ-(β-hydroxyethylsulfonyl)-propylamine, N-β-sulfatoethyl-N-γ-(β-hydroxyethylsulfonyl)-butylamine, N-β-ethoxyethyl-N-δ-(β-hydroxyethylsulfonyl)-butylamine, N-γ-chloropropyl-N-β-(β-hydroxyethylsulfonyl)-ethylamine, N-phenyl-N-β-(β-hydroxyethylsulfonyl)-ethylamine, N-p-chlorophenyl-N-β-(β-hydroxyethylsulfonyl)-ethylamine, N-o-methylphenyl-N-β-(β-hydroxyethylsulfonyl)-ethylamine, N-p-methoxyphenyl-N-β-(β-hydroxyethylsulfonyl)-ethylamine, N-m-sulfophenyl-N-β-(β-hydroxyethylsulfonyl)-ethylamine, N-p-sulfophenyl-N-β-(β-hydroxyethylsulfonyl)-ethylamine, bis-[-(β-hydroxyethylsulfonyl)-ethyl]-amine, bis-[γ-(β-hydroxyethylsulfonyl)-propyl]-amine, bis-[δ-(β-hydroxyethylsulfonyl)-butyl]-amine, and the corresponding sulfated compounds.

Preference is given to the amines of low molecular weight, such as β-(β-hydroxyethylsulfonyl)-ethylamine and its N-methyl derivative. Preference is also given to bis-[β-(β-hydroxyethylsulfonyl)-ethyl]-amine and the corresponding sulfated compounds.

The diazotisation of the diazo components or of the intermediates containing a diazotisable amino group is generally effected by the action of nitrous acid in aqueous mineral acid solution at low temperature. The coupling onto the coupling component is effected at strongly acid, neutral or weakly alkaline pH.

The reaction of the reactive components with the diazo components and the coupling components or with acylatable monoazo or disazo intermediates or with the amino-containing dyes is preferably effected in aqueous solution or suspension at low temperature and at weakly acid, neutral or weakly alkaline pH. If desired, the hydrogen halide liberated in the course of the condensation is continuously neutralised by addition of aqueous alkali metal hydroxides, carbonates or bicarbonates.

The reactive dyes of the formula (1) are suitable for dyeing and printing a very wide variety of materials, such as silk, leather, wool, nylon fibres and polyurethanes, and in particular cellulose-containing fibre materials of any kind. These fibre materials are for example the natural cellulose fibre, such as cotton, linen and hemp, and wood pulp and regenerated cellulose. The reactive dyes of the formula (1) are also suitable for dyeing or printing hydroxyl-containing fibres which are contained in blend fabrics, for example blends of cotton with polyester fibres or nylon fibres.

The dyes according to the invention can be applied to the fibre material and be fixed on the fibre in various ways, in particular in the form of aqueous dye solutions and print pastes. They are suitable not only for the exhaust method of dyeing but also for dyeing by the pad dye method, whereby the cloth is impregnated with aqueous dye solutions which can, if desired, also contain salt, and the dyes are fixed after an alkali treatment or in the presence of alkali, if desired with heating. They are particularly suitable for the so-called cold pad-batch method, whereby the dye is applied together with the alkali on a pad-mangle and is then fixed by storing at room temperature for a plurality of hours. After fixing, the dyeings and prints are thoroughly rinsed with cold and hot water, if desired in the presence of an agent which acts like a dispersant and promotes the diffusion of the unfixed portions.

The reactive dyes of the formula (1) are distinguished by high reactivity and good fixing properties. They can therefore be used in the exhaust dyeing method at low dyeing temperatures and only require short steaming times in the pad-steam method. The degrees of fixation are high, and the unfixed portions can be readily washed off, the difference between the degree of exhaustion and the degree of fixation being remarkably small, i.e. the hydrolysis loss being very low. The reactive dyes of the formula (1) are also suitable for printing, especially on cotton, but also for printing nitrogen-containing fibres, for example wool, silk or wool-containing blend fabrics.

The dyeings and prints on cellulose fibre material prepared with the dyes according to the invention have a high tinctorial strength and a high fibre-dye bond stability not only in the acid but also in the alkaline range, as well as a good light fastness and very good wet fastness properties, such as wash, water, seawater, cross-dyeing and perspiration fastness properties, and a good pleating fastness, hot press fastness and rub fastness.

The following examples serve to illustrate the invention. The temperatures are given in degrees celsius, and parts and percentages are by weight unless otherwise stated. Parts by weight relate to parts by volume as the kilogramme relates to the liter.

The preparation of the monoazo or disazo intermediates is not described in all cases in the illustrative embodiments below, but it is readily evident from the general description.

EXAMPLE 1

Preparation of isocyanate compound (I)

(I)

0.5 mol of 2-aminoethyl 2'-chloroethyl sulfone hydrochloride (well dried) are mixed at a bath temperature of 75° into 250 ml of chlorobenzene, and phosgene gas is passed in with stirring at a rate of 1–3 bubbles/sec. The bath temperature is gradually raised to 95°. After a total of 250 g of phosgene have been passed in, a clear 2-phase mixture is present. After flushing with nitrogen, the solvent is evaporated off in vacuo. This leaves an oil which, according to elemental analysis, consists of about 65% of isocyanate (I) and 35% of precursor (II)

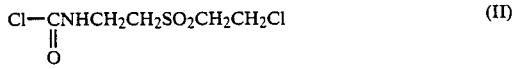

GC analysis at an injector temperature of 160° C. indicates an isocyanate content of 95%. Substance (I) is distillable. Boiling point 104°–105° C./0.02–0.04 torr.

EXAMPLE 2

Reaction of (I) with H acid

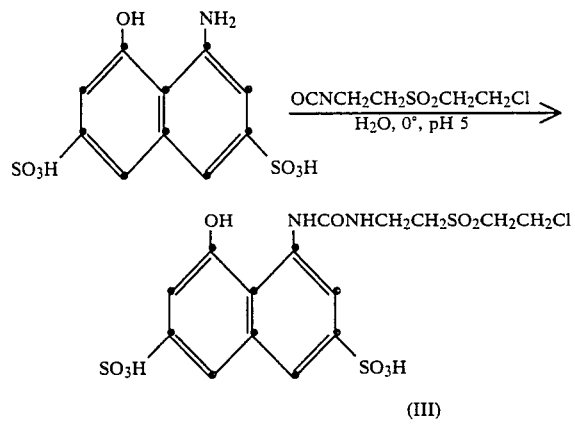

40 g of H acid (0.1 mol) are dissolved at pH 5.0 in 250 ml of water, and the solution is cooled down to 0°.

26 g of isocyanate mixture from Example (1) are then added dropwise at a constant pH of 5.0 and a temperature of 0° C. with thorough stirring in the course of 45–60 minutes, and conversion is monitored by thin layer chromatography. After an hour the yellowish solution is evaporated to dryness at 40° under neutral conditions. The resulting compound (III) is practically uniform.

EXAMPLE 3

0.03 mol of 2-aminonaphthalene-1,5-disulfonic acid is dissolved in 100 ml of water under alkali conditions using sodium hydroxide solution to form a clear solution, and 0.03 mol of $NaNO_2$ is added. This solution is added dropwise at 0°–5° to a mixture of 100 g of ice-water and 10 ml of concentrated hydrochloric acid. The resulting diazo suspension is stirred at 0°–5° for 1 hour. Excess nitrite is destroyed, and 0.033 mol of coupler of formula (III) dissolved in a little water is added to the diazo suspension. The pH is raised by addition of 2 N NaOH solution to pH 6–7. The coupling ends at once, and a red solution is present. The temperature is then raised to 30° C., followed at pH 9–10 by vinylation for 30 minutes.

The dye is isolated at pH 7.0 with 20% of salt. The dye is filtered off, is washed with 20% salt solution and is dried at 50° in a vacuum drying cabinet. This gives 18.7 g of a red dye of the formula IV which is readily soluble and highly suitable for cold dyeing

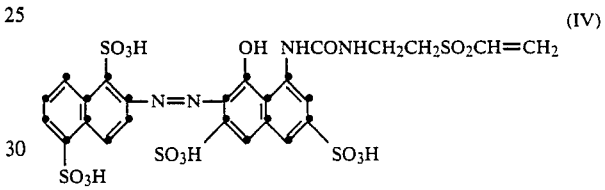

EXAMPLE 4

In place of 2-aminonaphthalene-1,5-disulfonic acid in Example 3, it is possible to diazotise the diazo component of the formula (V)

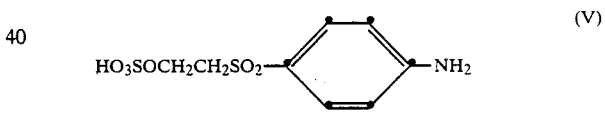

in the same way and to couple it on the same coupler as mentioned in Example 3. Vinylation under alkaline conditions gives a dyeing quantitatively fixed in the cold pad-batch process.

The dye used has the formula

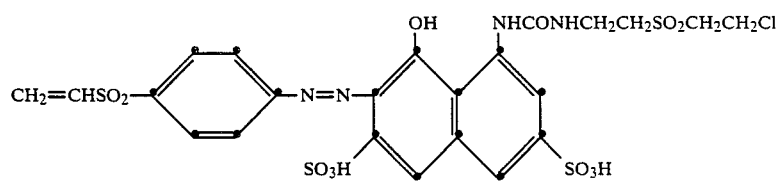

EXAMPLE 5

0.025 mol of dye of the formula

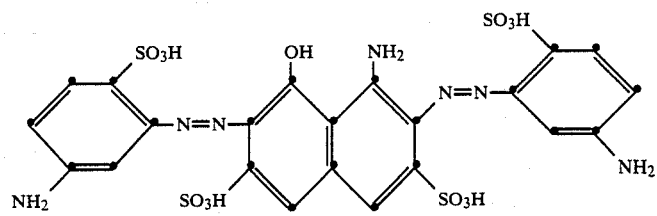

is dissolved in 400 ml of hot water under neutral conditions to form a clear solution and is acylated at pH 5.0 and 0° C. with 0.075 mol of product from Example 1 in the course of 4 hours. Clarification is followed by salting out with 10% sodium chloride. The resulting dye of the formula VII is pure and gives high degrees of fixation in both exhaust dyeing and cold pad-batch dyeing.

The dye has the formula

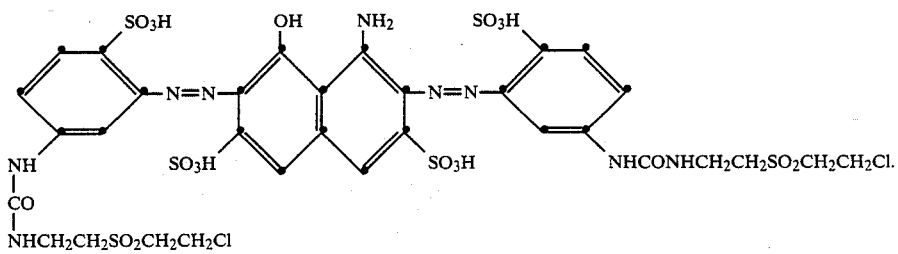

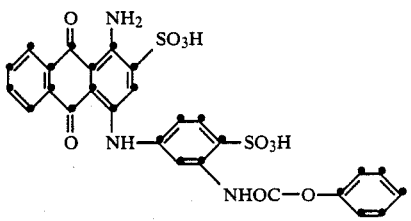

EXAMPLE 6

4.9 ml of phenyl chloroformate are added dropwise at a temperature of 35°–40° with thorough stirring to a solution of 2/100 mol of the intermediate of the formula

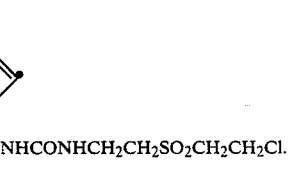

in 200 ml of water in the course of about 1 hour, while the pH is maintained at 5.5–6 by addition of 10% sodium carbonate solution. The progress of the reaction can be followed by thin layer chromatography. The result obtained is a blue solution which contains the intermediate of the formula To this solution are added 4.6 g of the compound of the formula $$H_2N-CH_2-CH_2-SO_2-CH_2-CH_2-OH$$

which is followed by raising the temperature to 45° and stirring at pH 7.5 for 8 hours. In this stage the degree of conversion can likewise by monitored by thin layer chromatography.

By addition of 15% by volume of potassium chloride the resulting compound of the formula

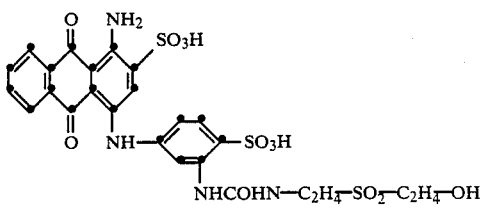

is precipitated as the potassium salt, is filtered off and is subsequently dried at 110° in vacuo.

To sulfate the potassium salt thus obtained, 30 g thereof are added at room temperature to 150 ml of sulfuric acid monohydrate, and the mixture is stirred at room temperature for 2 hours and is then poured onto 400 g of ice. The resulting precipitate is filtered off and is washed with 20% potassium chloride solution, the filter cake is then suspended in 150 ml of water, and the suspension is brought by addition of sodium hydroxide solution to pH 5.5.

5% by volume of potassium chloride are added, the potassium salt of the precipitated dye of the formula

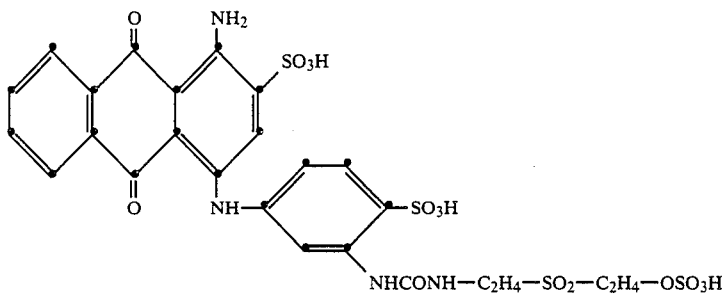

is filtered off and is dried at 60° in vacuo. The dye is obtained as a blue powder which gives a blue solution in water. Applied to cotton by the reactive dyeing methods customary for vinylsulfonyl dyes, the dye produces reddish blue dyeings having good fastness properties.

If, in place of the abovementioned anthraquinone dye, other corresponding anthraquinone dyes are used as educts in analogous procedures, this gives the reactive dyes listed in the following Table, which on cotton likewise produce fast blue dyeings.

TABLE 1

| No. | Dyes | Shade on cotton |
|---|---|---|
| 1 | (anthraquinone dye structure with $NH_2$, $SO_3H$, $CH_3$, $SO_3H$, $CH_3$, $CH_3$, $NHCOHN-C_2H_4-SO_2-C_2H_4-OSO_3H$) | reddish blue |
| 2 | (anthraquinone dye structure with $NH_2$, $SO_3H$, $NH$–phenyl–$NHCOHN-C_2H_4-SO_2-C_2H_4-OSO_3H$, $SO_3H$) | greenish blue |
| 3 | (anthraquinone dye structure with $NH_2$, $SO_3H$, $NH$–phenyl–$NHCOHN-C_2H_4-SO_2-C_2H_4-OSO_3H$, $SO_3H$) | greenish blue |

TABLE 1-continued

| No. | Dyes | Shade on cotton |
|-----|------|-----------------|
| 4 | 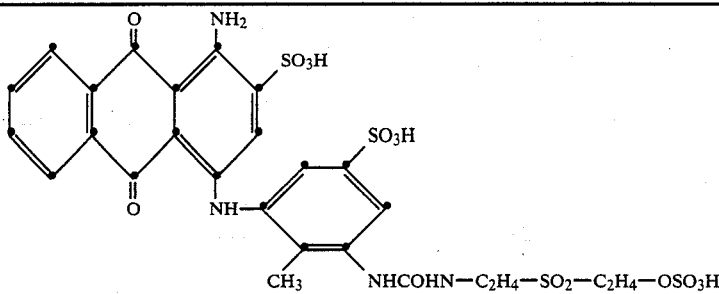 | blue |

EXAMPLE 7

Starting from the formazan dye of the formula

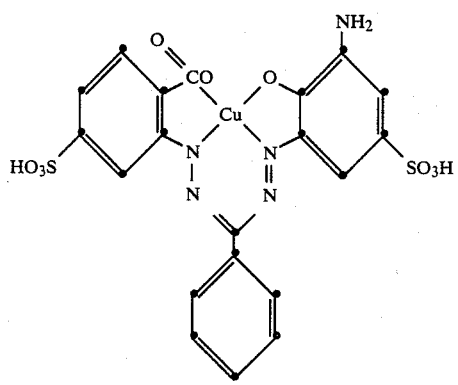

and following the procedure described in Example 6, acylation with phenyl chloroformate in aqueous solution at pH 5.5–6 and 40° followed by reaction of the intermediate thus formed with 2-aminoethyl 2'-hydroxyethyl sulfone at 40°–50° and pH 7.5 gives the product of the formula

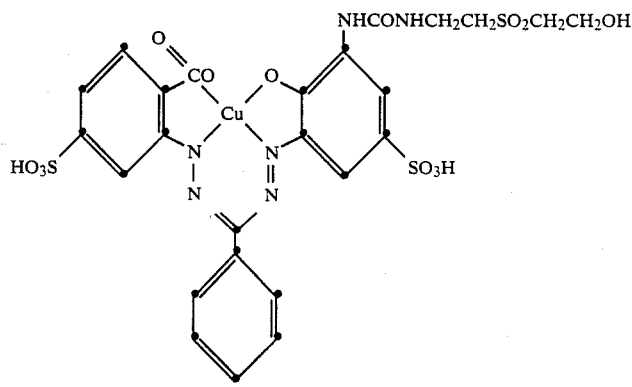

To sulfate this compound, 2/100 mol thereof are added to 30 ml of N-methylpyrrolidone, 2 ml of chlorosulfonic acid are added, and the mixture is stirred at a temperature of 40°–42° C. for 2 hours. The mixture is then poured onto 100 ml of ice-water, the pH is adjusted to 5.5 by addition of sodium bicarbonate, and the methylpyrrolidone is extracted with methylene chloride. The dye is precipitated from its solution by addition of potassium chloride in the form of the potassium salt, is filtered off and is dried at 60° in vacuo. The potassium salt of the dye of the formula

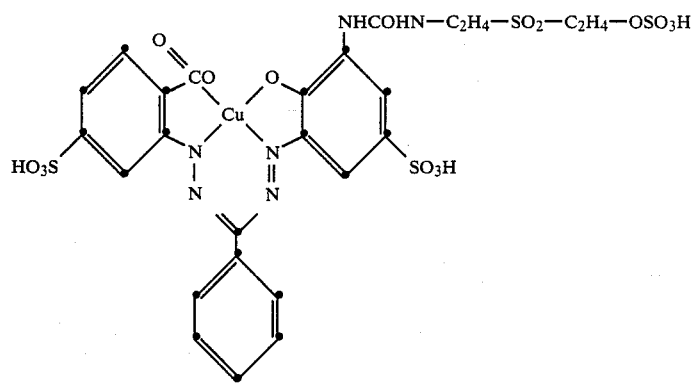

forms a blue powder which gives a blue solution in water.

Applied to cotton as a reactive dye using the methods customary for vinylsulfonyl dyes, the dye produces blue dyeings having good fastness properties.

If educts other than the formazan dye mentioned above are used, an analogous procedure correspondingly produces the dyes listed in the Table below, which, dyed on cotton as reactive dyes, produce fast blue dyeings.

TABLE 2

| No. | Dyes | Shade on cotton |
|---|---|---|
| 1 | 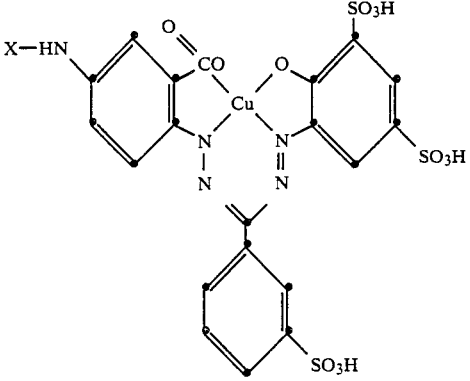<br>X = HO₃S—O—C₂H₄—SO₂—C₂H₄—NH—CO— | blue |
| 2 | 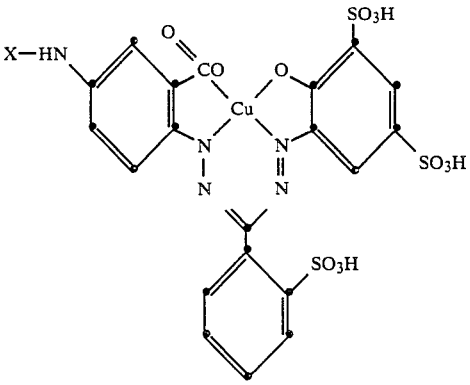 | blue |

EXAMPLE 8

7 ml of phenyl chloroformate are gradually added dropwise at 35°–40° with thorough stirring to a solution of 2/100 mol of the dye of the formula

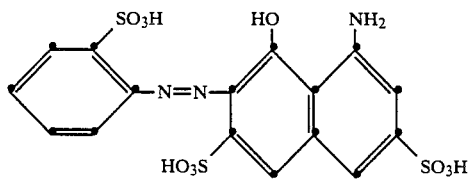

in 30 ml of water while the pH is maintained at 5–5.5 with 10% sodium carbonate solution. The degree of conversion can be monitored by thin layer chromatography.

The resulting solution of the product of the formula

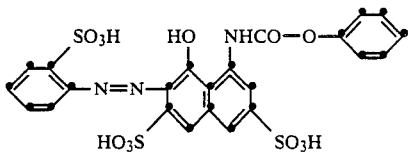

has added to it 3.8 g of 2-aminoethyl 2′-hydroxyethyl sulfone, and the mixture is stirred at 38°–40° and pH 7.5 for 5 hours. To remove freed phenol, the mixture is extracted with methylene chloride and is then brought to pH 7 with sodium hydroxide solution, and the resultant product of the formula

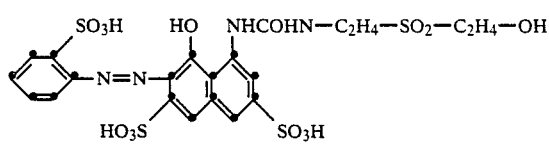

by evaporation of the solution in a rotary evaporator in vacuo is isolated as the sodium salt which is additionally dried at 110° in a vacuum cabinet. For the purposes of sulfation, 18 g of the sodium salt obtained above are added to 30 ml of N-methylpyrrolidone, 4 ml of chlorosulfonic acid are added, and the mixture is stirred at 40°–42° for 4 hours and is then poured onto 150 ml of ice-water. By addition of sodium bicarbonate the pH is adjusted to 5.5, and the methylpyrrolidone is subsequently extracted with methylene chloride. The solution of the resultant dye of the formula

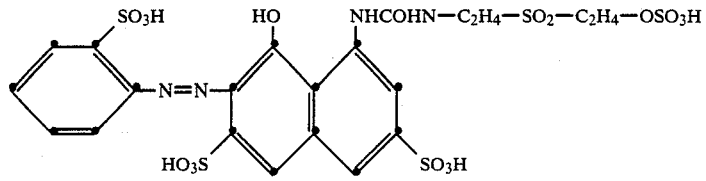

in the form of its sodium salt is evaporated to dryness at 40° in vacuo in a rotary evaporator. The dye is obtained as a red powder which gives a red solution in water.

Applied as a reactive dye to cotton using the dyeing methods customary for vinylsulfonyl dyes, the dye produces bluish red dyeings having good fastness properties.

Use of the corresponding educts and the same procedure produces the two dyes of the formulae

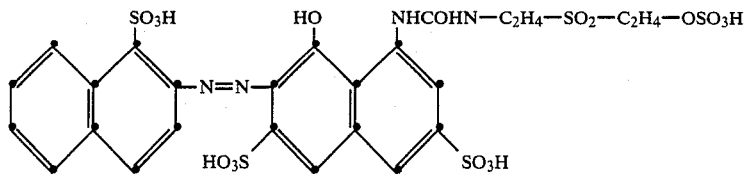

and

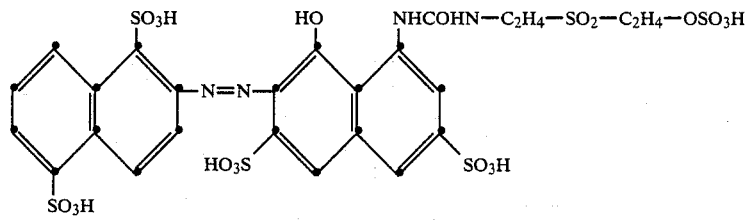

which on cotton produce bluish red dyeings having likewise good fastness properties.

EXAMPLE 9

30 ml of phenyl chloroformate are added dropwise at a temperature of 38°–40° to a suspension of 5/100 mol of the compound of the formula

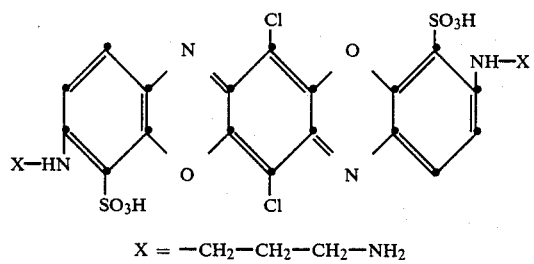

X = —CH$_2$—CH$_2$—CH$_2$—NH$_2$ in 2,000 ml of water in the course of 7 hours, during which the pH is maintained at 6–6.5 by addition of 10% sodium carbonate solution.

The resulting blue suspension which contains the product with

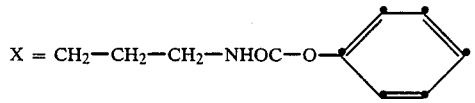

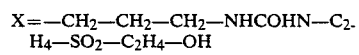

has added to it 17 g of 2-aminoethyl 2'-hydroxyethyl sulfone, and the mixture is stirred at 58°–60° and pH 7.5 for 6 hours. 10% by volume of potassium chloride are then added, the temperature is allowed to drop to room temperature, and the resulting precipitate is filtered off and washed with 10% potassium chloride solution. Drying at 110° in vacuo leaves the potassium salt of the product of the above formula wherein

X=—CH$_2$—CH$_2$—CH$_2$—NHCOHN—C$_2$H$_4$—SO$_2$—C$_2$H$_4$—OH in the form of a blue powder.

For the purposes of sulfation, 55 g of the intermediate thus obtained are added to 100 ml of N-methylpyrrolidone, 13.5 ml of chlorosulfonic acid are then added dropwise, and the resulting mixture is stirred at 40°–42° for 4 hours. The mixture is then poured onto 350 g of ice, and the pH is subsequently adjusted to 5.5 by addition of sodium bicarbonate. The methylpyrrolidone is then extracted with methylene chloride, 20% by volume of potassium chloride are then added, and the resulting precipitate is filtered off, is washed with 20% potassium chloride solution and is then dried at 60° in vacuo.

The result obtained is the potassium salt of the dye of the above formula in which

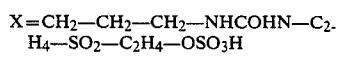

X=CH$_2$—CH$_2$—CH$_2$—NHCOHN—C$_2$H$_4$—SO$_2$—C$_2$H$_4$—OSO$_3$H in the form of a blue powder which gives a blue solution in water.
The blue dyeings obtained with this dye on cotton by the application methods for vinylsulfonyl reactive dyes have good fastness properties.
Further dyes which can be prepared by the methods indicated in the preceding Examples are the dyes of the formulae
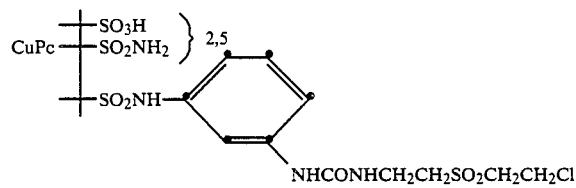
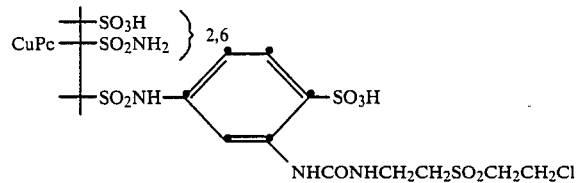
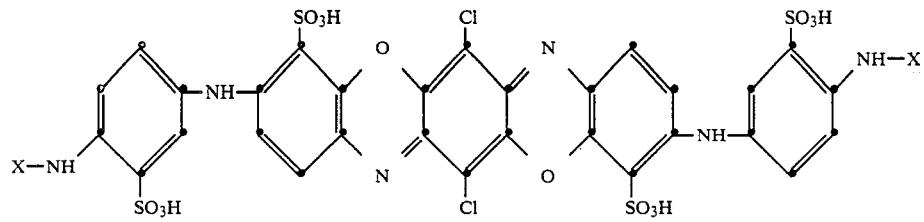
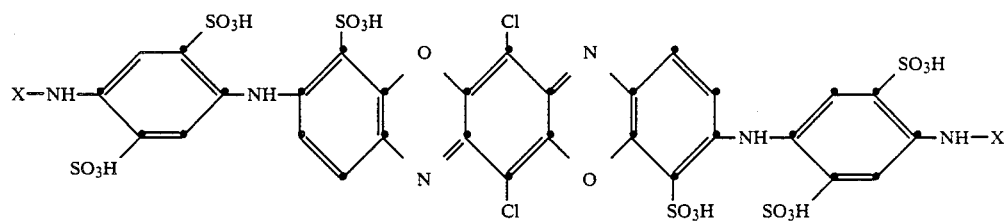
X = CONHCH₂CH₂SO₂CH₂CH₂Cl
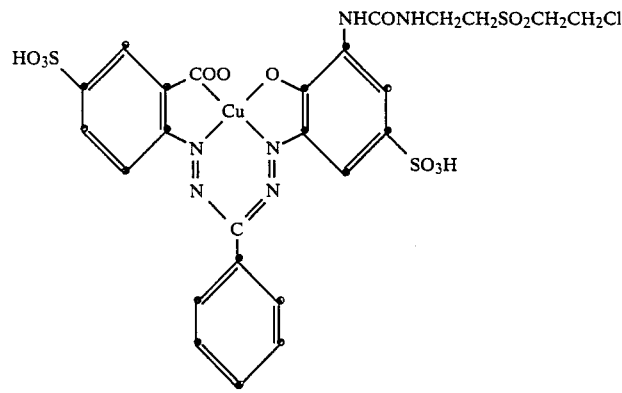
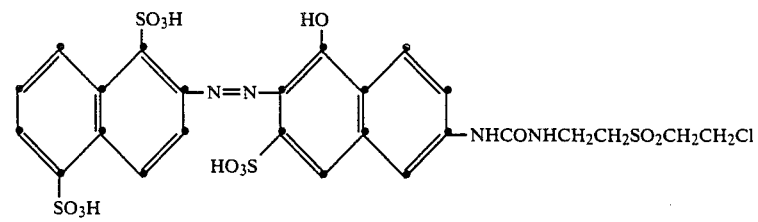

-continued
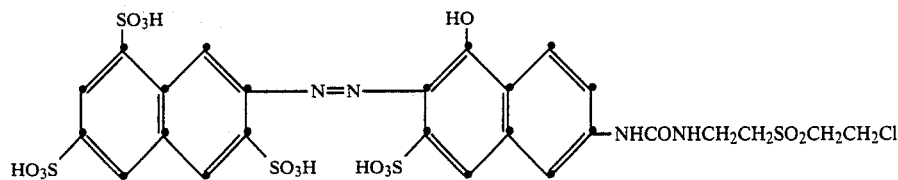
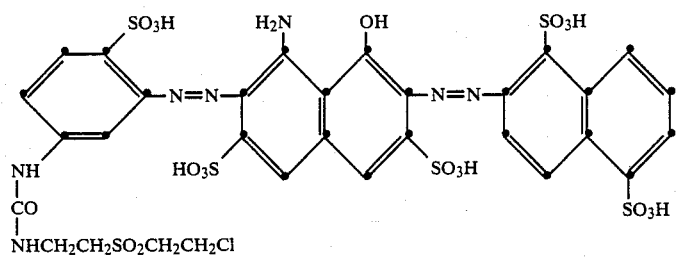
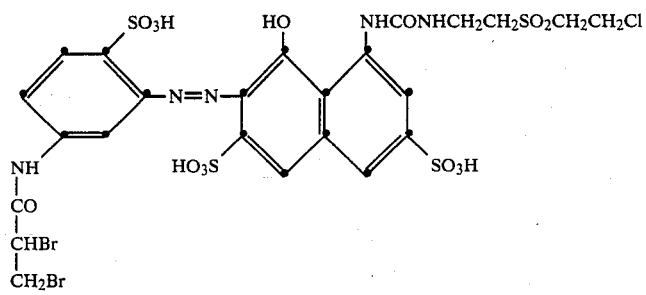
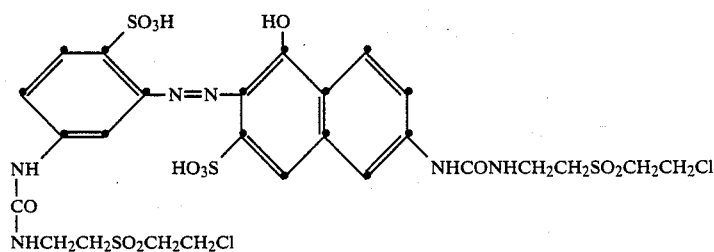
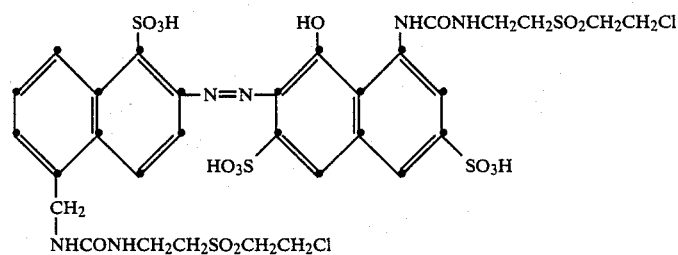
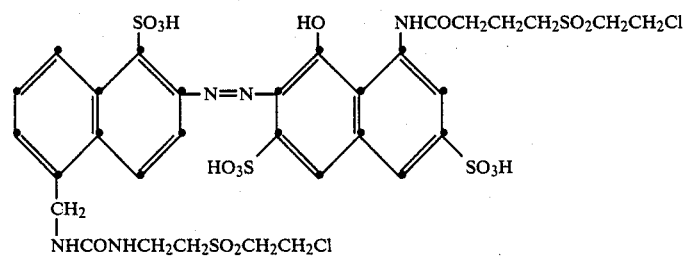

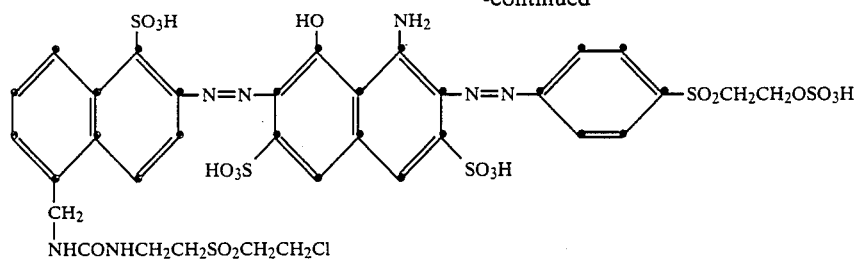

DYEING METHOD I 2 parts of the dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 1 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 1 are dissolved in 50 parts of water. To this solution are added 50 parts of a solution which contains per liter 16 g of sodium hydroxide and 0.04 liter of 38° Be sodium silicate. The resulting solution is applied to a cotton fabric on a pad-mangle in such a way that its weight increases by 70%, and the fabric is then wound onto a beam. In this state the cotton fabric is left to stand at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and is dried.

PRINTING METHOD I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

PRINTING METHOD II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is

in which $D_1$ and $D_2$ are each a radical of a benzene or naphthalene diazo component, K is the radical of an aminonaphtholsulfonic acid coupling component, R is hydrogen, methyl or ethyl, and n is 1 or 2, and the reactive radical is bonded to the diazo component $D_1$ or the diazo component $D_2$, or one reactive radical each is bonded to $D_1$ and $D_2$.
17. A 1:1 copper complex of a reactive dye according to claim 14.
18. A reactive dye according to claim 16 of the formula
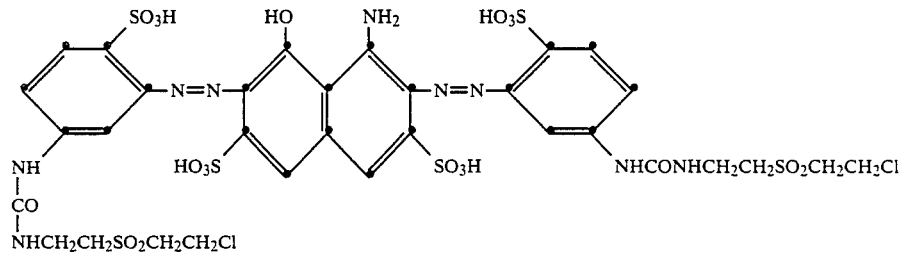

We claim:

1. A reactive dye of the formula

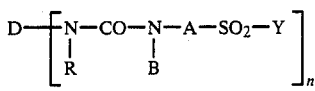  (1)

in which D is the radical of a monoazo, polyazo, metal complex azo, anthraquinone phthalocyanine, formazan, azomethine, dioxazine, phenazine, stilbene, triphenylmethane, xanthene, thioxanthone, nitroaryl, naphthoquinone, pyrenequinone or perylenetetracarbimide dye, R is hydrogen or $C_1$–$C_4$-alkyl which is unsubstituted or is substituted by halogen, hydroxyl, cyano, $C_1$–$C_4$-alkoxy, carboxyl or sulfo, A is straight-chain or branched $C_2$–$C_6$-alkylene which is unsubstituted or is substituted by chlorine, bromine, fluorine, hydroxyl, sulfato, $C_1$–$C_4$-alkanoyloxy, cyano, carboxyl, alkoxycarbonyl having 1 to 5 C-atoms or carbamoyl, or is alkyleneoxyalkylene having 1 to 6 C-atoms in each alkylene member, independently of each other; Y is —CH=$CH_2$ or —$CH_2$—$CH_2$—Z, Z is —$OSO_3H$, —S-$SO_3H$, —$OCOCH_3$, —$OPO_3H_2$ or Cl, B is (a) hydrogen (b) $C_1$–$C_6$-alkyl which is unsubstituted or is substituted by halogen hydroxyl, cyano, $C_1$–$C_4$-alkoxy, carboxyl or sulfo, (c) $C_7$–$C_{20}$-alkyl, (d) cyclohexyl, (e) phenyl which is unsubstituted or is substituted by mtehyl, ethyl, methoxy, ethoxy, chlorine, bromine, carboxyl, sulfo or sulfomethyl or (f) a radical of the formula

—A—$SO_2$—Y wherein A and Y are as defined above and n is 1 or 2.

2. A reactive dye according to claim 1 in which B is hydrogen or $C_{1-4}$-alkyl.

3. A reactive dye according to claim 1 in which B is a radical of the formula

—A—$SO_2$—Y.

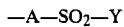

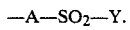

4. A reactive dye according to claim 3 in which A is ethylene.

5. A reactive dye according to claim 2 of the formula

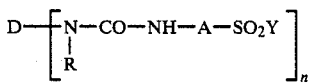  (3)

in which A is $C_{2-4}$-alkylene.

6. A reactive dye according to claim 5 in which A is ethylene.

7. A reactive dye according to claim 3 of the formula

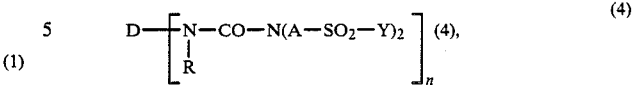  (4), in which A is $C_{2-4}$-alkylene.

8. A reactive dye according to claim 7 in which A is ethylene.

9. A reactive dye according to claim 1 in which Y is vinyl, β-sulfatoethyl, β-thiosulfatoethyl, β-phosphatoethyl, β-chloroethyl or β-acetoxyethyl.

10. A reactive dye according to claim 1 in which D is the radical of a monoazo or disazo dye.

11. A reactive dye according to claim 1 in which D is the radical of a metal complex azo or formazan dye.

12. A reactive dye according to claim 1 in which D is the radical of an anthraquinone dye.

13. A reactive dye according to claim 11 in which D is the radical of a 1:1 copper complex azo dye of the benzene or naphthalene series and the copper atom is bonded to a metallisable group on either side, in ortho-position relative to the azo bridge.

14. A reactive dye according to claim 10 of the formula

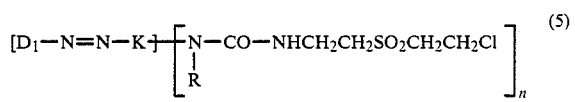  (5)

in which $D_1$ is the radical of a benzene or naphthalene diazo component, K is the radical of a benzene or naphthalene coupling component or is the radical of a heterocyclic coupling component, R is hydrogen, methyl or ethyl, and n is 1 or 2, and the reactive radical is bonded to the diazo component or to the coupling component, or one reactive radical each is bonded to the diazo component and to the coupling component.

15. A reactive dye according to claim 10 of the formula

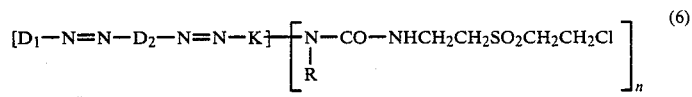  (6)

in which $D_1$ and $D_2$ are each a radical of a benzene or naphthalene diazo component, K is the radical of a benzene or naphthalene coupling component or is the radical of a heterocyclic coupling component, R is hydrogen, methyl or ethyl, and n is 1 or 2, and the reactive radical is bonded to the diazo component $D_1$ or to the coupling component K or one reactive radical each is bonded to $D_1$ and K.

16. A reactive dye according to claim 10 of the formula

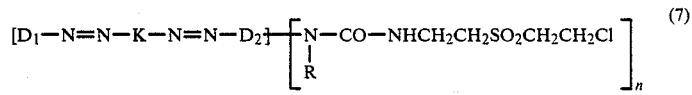  (7)